United States Patent [19]

Uemura

[11] Patent Number: 4,541,533
[45] Date of Patent: Sep. 17, 1985

[54] CHAIN FOR A MACHINING CENTER

[75] Inventor: Takeshi Uemura, Osaka, Japan

[73] Assignee: Tsubakimoto Chain Co., Osaka, Japan

[21] Appl. No.: 484,226

[22] Filed: Apr. 12, 1983

[30] Foreign Application Priority Data

Apr. 15, 1982 [JP]  Japan .................................. 57-61826

[51] Int. Cl.[4] .............................................. A47F 7/00
[52] U.S. Cl. ...................................... 211/1.5; 29/568; 211/70.6
[58] Field of Search ............... 211/1.5, 60 T; 29/568, 29/26 A

[56] References Cited

U.S. PATENT DOCUMENTS

| 3,727,301 | 4/1973 | Tsuzuki et al. | 211/1.5 X |
| 3,817,391 | 6/1974 | Lohneis et al. | 211/1.5 |
| 4,182,021 | 1/1980 | Kato et al. | 211/1.5 X |
| 4,296,541 | 10/1981 | Tsuboi et al. | 29/568 |

Primary Examiner—Robert W. Gibson, Jr.
Attorney, Agent, or Firm—Parkhurst & Oliff

[57] ABSTRACT

A machining center chain is provided that is capable of holding various tools therein. A tool holding part is secured to one of a pair of oppositely disposed link plates, while a pull stud bolt holding part is secured to the other of the pair of link plates. The position of the pull stud bolt holding part with respect to its respective link plate may be adjustable, while stay pins may be provided between the link plates of each pair to enhance the rigidity of the assembly.

12 Claims, 12 Drawing Figures

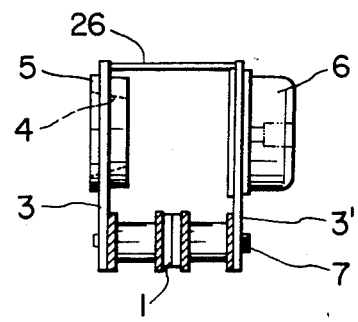
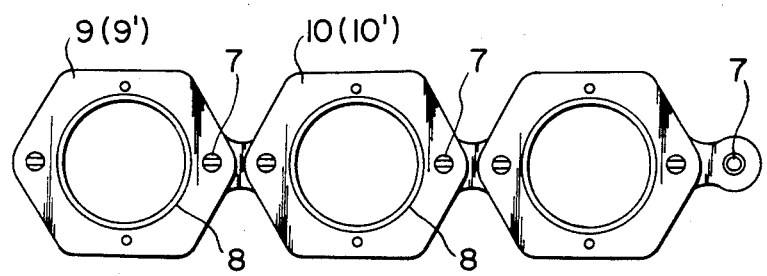
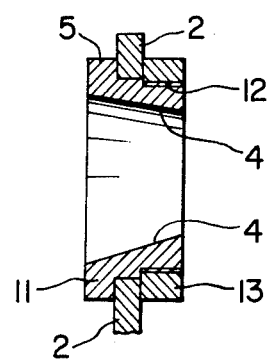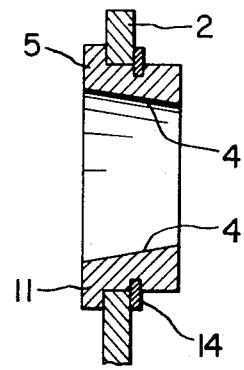

CHAIN FOR A MACHINING CENTER

BACKGROUND

This invention relates to a machining center in which various kinds of tools are supplied and stored in compliance with the operation of numerically controlled (NC) machine tools, etc.

More specifically, the present invention relates to a machining center chain having pairs of link plates, in which an attachment for holding a tool is arranged at each of the link plates of the pair. According to the present invention, this can be done without fixing a tool storing magazine between the pair of oppositely faced link plates of the machining center chain, thereby allowing the chain to achieve a light weight, and further giving significant versatility in storing various kinds of tools.

In the conventional arrangement of the pair of oppositely faced link plates in a machining center chain, a tool storing magazine M as shown in FIGS. 1 and 2 is installed between the plates.

That is, in FIG. 1, a pair of oppositely faced link plates P and P' of one or more chains C (a single row of chain being available) engaged with a sprocket S have been provided with holding holes into which a magazine M is fitted. The magazine M has been fitted to and held by said holding holes, and has been provided with a tapered hole H into which a tapered protrusion of a tool T is fitted. Said magazine M is fixed by snap rings, etc. so as to avoid being removed from the link plates P and P'.

Therefore, since the machining center chain C is moved along with the number of magazines M being held between each of a pair of oppositely faced link plates, the total weight of the assembly includes the weight of the chain C itself, added to the weight of a number of the magazines. Consequently, the motive power needed to operate the chain must necessarily be quite large. In addition to the above, the protrusion of the tool may be of various end shapes or socket lengths, so that even if the taper and diameter of the tool protrusion are not varied, an entire magazine must be replaced each time the end shape or the length of the protrusion is varied. Due to this fact, the prior art requires that several types and numbers of magazines be prepared and replaced during normal operation.

SUMMARY OF THE INVENTION

The present invention, free from the conventional ideas concerning the tool magazine, eliminates the disadvantages of the conventional type of magazine as described above and proposes a novel tool holding portion in the machining center chain.

Briefly, the present invention contemplates the provision of two separate elements to support the tool, each smaller than one half of the conventional magazine. The first element, a tool holding part, is secured to a first one of two oppositely disposed link plates. The second element is a pull stud bolt holding part, and is secured to the second link plate. The pull stud bolt holding part can advantageously be provided with a mechanism by which the tool protrusion can be releasably held.

BRIEF DESCRIPTION OF THE DRAWINGS

FIGS. 3 to 12 illustrate preferred embodiments of the present invention, in which:

FIG. 3 is a front elevational view of a pair of opposite link plates;

FIG. 4 is a top plan view of the device illustrated in FIG. 3;

FIG. 5 is a side elevational view of the device illustrated in FIG. 3;

FIG. 6 is a front elevational view corresponding to FIG. 3 of another preferred embodiment of the present invention;

FIG. 7 is a side sectional view illustrating one assembly of the tool holding part;

FIG. 8 is a side sectional view illustrating another preferred embodiment different from that shown in FIG. 7;

FIG. 9 is a side sectional view illustrating one assembly of the pull stud bolt holding portion;

FIG. 10 is a side sectional view illustrating another preferred embodiment different from that shown in FIG. 9;

FIG. 11 is a side sectional view showing a pull stud bolt holding part when its fixed position is adjusted; and FIG. 12 is a side sectional view illustrating another preferred embodiment differing from that shown in FIG. 11.

DETAILED DESCRIPTION OF THE PREFERRED EMBODIMENTS

Figure 1:
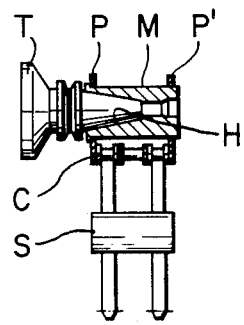
FIG. 1 is a side sectional view of a magazine which is fixed to a conventional type of machining center chain.
Figure 2:
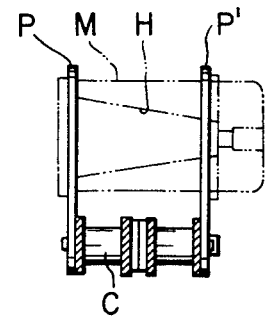
FIG. 2 is a side elevational view showing a link plate to which a prior art magazine is fixed.
Figure 3:
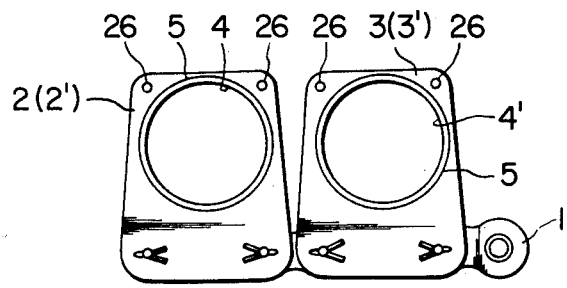
Figure 4:
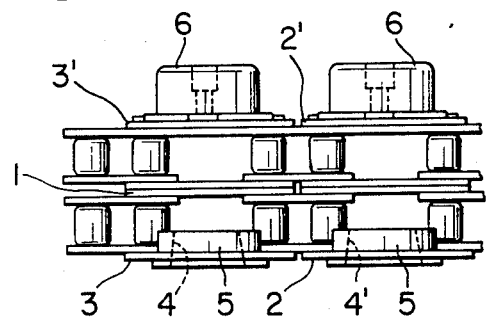

FIG. 3 is a front elevational view in which a substantial part of the machining center chain 1 is enlarged, wherein one of the link plates 2, 3 of a pair of oppositely faced link plates 2, 2', 3, 3' of said chain 1 is provided with a tool holding part 5. Each of the tool holding parts includes a tapered hole 4, 4' into which a protrusion of the tool T is inserted. The other link plates 2', 3' are each provided with the pull stud bolt holding portions 6 into which the end of the tool T is inserted and held as shown in a top plan view of FIG. 4. The link plates 2, 2', 3, 3' having said tool holding part 5 and the pull stud bolt holding part 6 are at a higher level than that of other link plates as apparent from FIG. 3 and a side elevational view of FIG. 5. They also hold the axial center of the tool T at a higher level than the connector pin 7 of the chain. However, the axial center of the tool T is not necessarily held at a higher level than the connector pin 7 and, as shown in another preferred embodiment illustrated in FIG. 6, an arrangement in which a pair of oppositely faced link plates 9, 9', 10, 10' have a tool holding part 8 and a pull stud bolt holding part 6 holding the axial center of the tool T at the same level as the connector pin 7 is also possible, although said link plates have a higher level than the other link plates.

FIGS. 7 and 8 are sectional views showing the assembled tool holding part 5. In FIG. 7, the tool holding part 5 is formed with a flange 11 as well as a threaded part 12 threadably engaged with a nut 13. They are fixed such that the link plate 2 is held and fastened by a threaded engaging nut 13 for said threaded part 12. The assembly in FIG. 8 is similar to that of FIG. 7, but the link plate 2 is press held by a snap ring 14. Other nonillustrated embodiments could include bolts inserted into the link plate 2 and the flange 11 and fastened with nuts, or one side surface of the link plate 2 being press fitted to the flange surface and the other side surface of the link plate being welded to the tool holding part. Further, the tool holding part 5 may be of plastic, cast molded at both sides of the link plate so as to make it integral therewith, or by various other types of well-known application methods.

Figure 9:
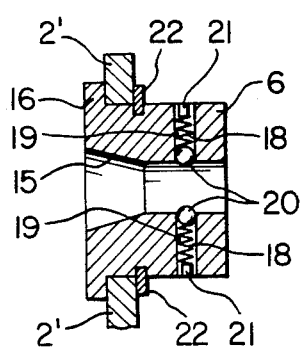
Figure 10:
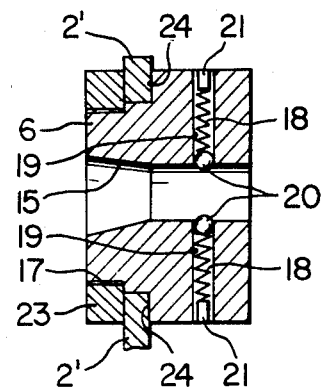

FIGS. 9 to 12 illustrate assemblies of the pull stud bolt holding part 6 and the link plates 2′, 3′. The pull stud bolt holding part 6 is formed with a partial tapered fixing hole 15 into which the end of the tool is inserted and held. The deep end of the fixing hole 15 has a plurality of radial holding holes 19 therein to accommodate biasing springs 18. The end of each of these holding holes 19 opened to said fixing hole 15 is reduced at its extreme end, and thereby is made slightly smaller than the diameter of the tool engaging ball 20. A threaded pin 21 for compressing and holding the biasing spring 18 within the hole 19 is threadably fitted to the outer end opening of said holding hole 19. As a result, the tool engaging ball 20 is biased and held at the open end part of the holding hole 19 while projecting from the inner surface of the fixing hole 15 by means of the biasing spring 18, and the ball is consequently urged to engage a concave contour formed in part of the tool protrusion. The pull stud bolt holding part 6 is removably fitted to the link plate. Provision for this capability can be made in a number of ways. As shown in FIG. 9, the link plate 2′ is secured between a flange 16 and a snap ring 22, while in FIG. 10 the link plate 2′ is constrained between a nut 23 threadably engaged with a threaded part 17 of reduced diameter, and a shoulder 24 formed in the pull stud bolt holding part 6. Other mechanisms for removably fixing the element may be used.

Figure 11:
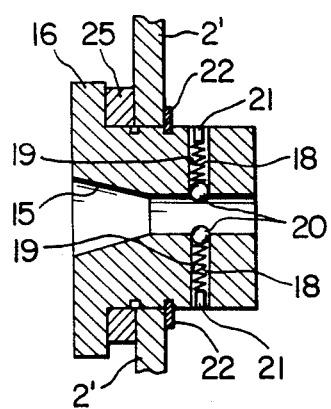
Figure 12:
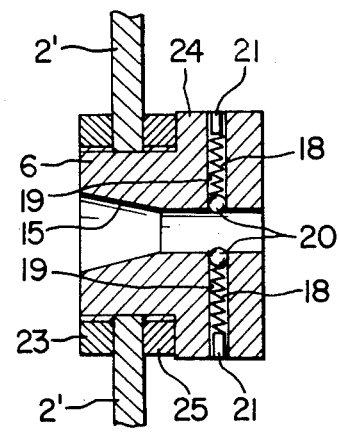

As can be seen, the present invention can accommodate a variation in the shape of the tool protrusion by simply replacing the pull stud bolt holding part 6 with another such part having a fixing hole 15 of a shape appropriate to the particular type of tool ends desired. Further, to accommodate a variation in the length of the tool protrusion, as shown in FIG. 11, the present invention requires only the installation of a spacer piece 25 between the flange 16 and the link plate 2′, and moving the axial position of the snap ring 22. Another method, illustrated in FIG. 12, could involve a spacer piece 25 between the shoulder 24 and the link plate 2′ so as to adjust the relative position between the link plate 2′ and the pull stud bolt holding part 6.

As described above, the present invention can accommodate variations in the shape and length of different tool protrusions by replacing only the pull stud bolt holding part or adjusting its position without replacing the tool holding part. This is due at least in part to the tool holding part and the pull stud holding part being separately arranged at a pair of oppositely faced link plates, and as a result the adjusting or replacement of an entire magazine M as found in the conventional type of the machine is not needed.

In particular, when the length of the tool protrusion is varied, any tools can be held by the same pull stud bolt holding part, so that a number of types of pull stud bolt holding parts are not necessary. Since the tool holding part and the pull stud bolt holding part are arranged separately in place of the magazine, the intermediate portion of the conventional type of magazine is eliminated along with the corresponding weight, so that the total weight of the machining center chain is substantially decreased. As a further advantage, the chain driving force can be greatly reduced so as to provide a lightweight machining center chain at a reduced cost. Since each of the tool holding parts and the pull stud bolt holding parts is small compared to the conventional type of magazine, the associated machining work is not only easy, but also yields a degree of freedom that enables the list of suitable materials to be widened.

Arrangement of stay pins 26 between the link plates as shown in FIGS. 3 and 5 may increase the rigidity of the link plates 2, 2′, 3, 3′, while assuring that the degree of concentricity between the tool holding part and the pull stud bolt holding part can be maintained, thereby improving the accuracy with which the tools may be stored and held.

The foregoing description has been made for illustrative purposes only, and should be understood to limit the appended claims by way of example only.

What is claimed is:

1. A machining center chain having oppositely faced link plates comprising:
   a tool holding part having a tapered first hole therein for receiving a tool, the tool holding part being disposed in a first of a pair of said oppositely faced linked plates; and
   a separate pull stud bolt holding part having a second hole therein for receiving and holding an end of said tool, said pull stud bolt holding part being disposed in a second of said pair of oppositely faced linked plates and opposite to said tool holding part.

2. A machining center chain as in claim 1, wherein the chain is held together by connecting pins, and the axial center of at least one of said first and second holes is above the axial center of said connecting pins.

3. A machining center chain as in claim 1, wherein the chain is held together by connecting pins, and the axial center of at least one of said first and second holes is at the same level as the axial center of said connecting pins.

4. A machining center chain as in claim 1, wherein the axial position of the pull stud bolt holding part in relation to the second link plate is adjustable.

5. A machining center chain as in claim 4, wherein the pull stud bolt holding part is provided with a flange at one axial end thereof, and there is further provided a snap ring which is removably secured to the pull stud bolt holding part, the second link plate being secured to the pull stud bolt holding part by being constrained between the flange and the snap ring, and further wherein the adjustability is provided by a plurality of axially spaced apart locations on the pull stud bolt holding part at which the snap ring may be located, and at least one spacer piece which can be optionally placed between said flange and said second link plate.

6. A machining center chain as in claim 4, wherein the pull stud bolt holding part is provided with a flange and a threaded, reduced diameter portion, and wherein there is further provided a nut capable of engaging the reduced diameter portion, and a spacer piece, such that the second link plate can be secured between the nut and the flange, and the adjustability can be provided by optionally placing the spacing piece between the flange and the second link plate.

7. A machining center chain having oppositely faced link plates, comprising: a tool holding part having a tapered first hole therein adapted to receive a tool; a pull stud bolt holding part having a second hole therein adapted to receive and hold an end of said tool; wherein the tool holding part and stud bolt holding part are separately arranged in first and second oppositely faced link plates of a chain, respectively; and stay pins that extend between said pair of said link plates.

8. A machining center chain as in claim 7, wherein the chain is held together by connecting pins, and the axial center of at least one of said first and second holes is above the axial center of said connecting pins.

9. A machining center chain as in claim 7, wherein the chain is held together by connecting pins, and the axial center of at least one of said first and second holes is at the same level as the axial center of said connecting pins.

10. A machining center chain as in claim 7, wherein the position of the pull stud bolt holding part in relation to the second link plate is adjustable.

11. A machining center chain as in claim 10, wherein the pull stud bolt holding part is provided with a flange at one axial end thereof, and there is further provided a snap ring which is removably secured to the pull stud bolt holding part, the second link plate being secured to the pull stud bolt holding part by being constrained between the flange and the snap ring, and further wherein the adjustability is provided by a plurality of axially spaced apart locations on the pull stud bolt holding part at which the snap ring may be located, and at least one spacer piece which can be optionally placed between said flange and said second link plate.

12. A machining center chain as in claim 10, wherein the pull stud bolt holding part is provided with a flange and a threaded, reduced diameter portion, and wherein there is further provided a nut capable of engaging the reduced diameter portion, and a spacer piece, such that the second link plate can be secured between the nut and the flange, and the adjustability can be provided by optionally placing the spacer piece between the flange and the second link plate.

* * * * *